(12) United States Patent
Liu et al.

(10) Patent No.: US 10,979,192 B2
(45) Date of Patent: Apr. 13, 2021

(54) UPLINK REFERENCE SIGNAL SENDING METHOD AND APPARATUS, BASE STATION, AND USER EQUIPMENT

(71) Applicant: Huawei Technologies Co., Ltd., Guangdong (CN)

(72) Inventors: Jianqin Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,374

(22) Filed: May 1, 2019

(65) Prior Publication Data
US 2019/0260541 A1  Aug. 22, 2019

Related U.S. Application Data

(63) Continuation of application No. PCT/CN2017/109218, filed on Nov. 3, 2017.

(30) Foreign Application Priority Data

Nov. 3, 2016 (CN) .......................... 201610954272.4

(51) Int. Cl.
*H04L 5/00* (2006.01)
*H04B 7/06* (2006.01)
*H04L 27/26* (2006.01)

(52) U.S. Cl.
CPC ......... *H04L 5/0051* (2013.01); *H04B 7/0617* (2013.01); *H04L 5/0007* (2013.01);
(Continued)

(58) Field of Classification Search
CPC ..... H04L 5/0051; H04L 27/26; H04L 5/0094; H04L 5/0007; H04L 5/0042; H04L 5/0048; H04L 27/261; H04B 7/0617
See application file for complete search history.

(56) References Cited

U.S. PATENT DOCUMENTS

2013/0322280 A1  12/2013  Pi
2014/0177573 A1   6/2014  Han et al.
(Continued)

FOREIGN PATENT DOCUMENTS

| CN | 102377714 A | 3/2012 |
|----|-------------|--------|
| CN | 102970761 A | 3/2013 |
| CN | 103813375 A | 5/2014 |

*Primary Examiner* — Kabir A Timory
(74) *Attorney, Agent, or Firm* — Hauptman Ham, LLP

(57) ABSTRACT

This application provides an uplink reference signal sending method and apparatus, a base station, and user equipment (UE). The method includes: configuring, by the base station, M pieces of uplink reference signal resource information for the UE; and sending, by the base station, the M pieces of uplink reference signal resource information to the UE, so that the UE sends uplink reference signals based on different uplink reference signal resource information with different beamforming gains. A path loss is compensated for by using a beamforming technology. In addition, the base station configures the M pieces of uplink reference signal resource information for the user equipment UE, so that the UE sends the uplink reference signals by using different relatively uplink reference signal resource information based on different beamforming gains. Therefore, uplink reference signal sending efficiency is improved.

12 Claims, 3 Drawing Sheets

(52) U.S. Cl.
CPC .......... *H04L 5/0042* (2013.01); *H04L 5/0094* (2013.01); *H04L 27/26* (2013.01)

(56) References Cited

U.S. PATENT DOCUMENTS

| | | | |
|---|---|---|---|
| 2016/0127095 A1* | 5/2016 | Chen | H04W 28/22 370/329 |
| 2016/0135147 A1* | 5/2016 | Ouchi | H04W 72/042 370/329 |
| 2016/0142190 A1 | 5/2016 | Lunttila et al. | |
| 2018/0309526 A1* | 10/2018 | Zhang | H04L 5/0023 |

\* cited by examiner

UPLINK REFERENCE SIGNAL SENDING METHOD AND APPARATUS, BASE STATION, AND USER EQUIPMENT

CROSS-REFERENCE TO RELATED APPLICATIONS

This application is a continuation of International Application No. PCT/CN2017/109218, filed on Nov. 3, 2017, which claims priority to Chinese Patent Application No. 201610954272.4, filed on Nov. 3, 2016. The disclosures of the aforementioned applications are hereby incorporated by reference in their entireties.

TECHNICAL FIELD

This application relates to the field of communications technologies, and in particular, to an uplink reference signal sending method and apparatus, a base station, and user equipment.

BACKGROUND

Spectra are essential resources in wireless communication. In a modern communications system such as a Global System for Mobile Communications (GSM), Code Division Multiple Access (CDMA) 2000 system, a Wideband Code Division Multiple Access (WCDMA) system, or a Long Term Evolution (LTE) system, an operating carrier frequency is usually below 3 Gigahertz (GHz).

With emergence of smart terminals, in particular, video services, current spectrum resources already have difficulty in meeting an explosively growing requirement of a user for a capacity. A high frequency band, in particular, a millimeter-wave band, that has a higher available bandwidth gradually becomes a candidate frequency band for a next-generation communications system. However, the high frequency band results in a larger path loss. Particularly, factors such as atmosphere and vegetation further increase a wireless propagation loss.

For uplink reference signal sending performed by user equipment (UE), a beamforming technology is an effective method for reducing a path loss. However, in the prior art, a base station configures same uplink reference signal resource information for different formed beams, and different formed beams usually have different beamforming gains. Apparently, when the base station configures same uplink reference signal resource information for formed beams with different gains, relatively low uplink reference signal sending efficiency is caused.

SUMMARY

This application provides an uplink reference signal sending method and apparatus, a base station, and user equipment, so that the base station configures different uplink reference signal resource information for the UE for different beamforming gains, to improve uplink reference signal sending efficiency.

According to a first aspect, this application provides an uplink reference signal sending method, including:

configuring, by a base station, M pieces of uplink reference signal resource information for user equipment UE, where M is a positive integer greater than or equal to 2; and sending, by the base station, the M pieces of uplink reference signal resource information to the UE, so that the UE sends uplink reference signals based on different uplink reference signal resource information with different beamforming gains.

A path loss is compensated for by using a beamforming technology. In addition, the base station configures the M pieces of uplink reference signal resource information for the user equipment UE, so that the UE sends the uplink reference signals by using different relatively uplink reference signal resource information based on different beamforming gains. Therefore, uplink reference signal sending efficiency is improved.

Optionally, the sending, by the base station, the M pieces of uplink reference signal resource information to the UE includes: sending, by the base station, the M pieces of uplink reference signal resource information to the UE by using higher layer signaling or physical layer signaling. Therefore, flexibility of sending the uplink reference signal resource information is improved.

Optionally, the method further includes: each piece of uplink reference signal resource information is corresponding to unique index information; and sending, by the base station, index information by using the physical layer signaling, where the index information sent by using the physical layer signaling is used to indicate index information corresponding to uplink reference signal resource information used for uplink reference signal sending currently triggered by the base station, so that the UE sends the uplink reference signal by using the uplink reference signal resource information corresponding to the index information.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the method further includes: sending, by the base station, indication information to the UE, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing (OFDM) symbols used by the UE to send the uplink reference signal and a set of UE-specific second OFDM symbols used by the UE to send the uplink reference signal; and the set of first OFDM symbols includes the set of second OFDM symbols.

To be specific, transmission bandwidths used when different UEs send uplink reference signals may be different. It is assumed that each UE can send the uplink reference signal only on one narrow band within each OFDM symbol. In this case, different quantities of OFDM symbols are occupied by different UEs after an entire system bandwidth is traversed. Therefore, the base station may perform flexible configuration depending on different requirements of the UE. To be specific, the base station configures, for the UE, the set of cell-specific first orthogonal frequency division multiplexing OFDM symbols used to send the uplink reference signal, and configures, for the UE, the set of UE-specific second OFDM symbols used to send the uplink reference signal.

Optionally, the uplink reference signal symbol configuration information includes first indication sub-information and second indication sub-information, the first indication sub-information is used to indicate the set of first OFDM symbols used by the UE to send the uplink reference signal, and the second indication sub-information is used to indicate the set of second OFDM symbols used by the UE to send the uplink reference signal; the first indication sub-information is carried in the higher layer signaling or the physical layer signaling; and the second indication sub-information is carried in the higher layer signaling or the physical layer signaling.

The following describes an uplink reference signal sending method on a UE side. Content and effects thereof are corresponding to content and effects on a base station side, and corresponding technical effects are not described below again.

According to a second aspect, an uplink reference signal sending method is provided, including: receiving, by user equipment UE, M pieces of uplink reference signal resource information sent by a base station; and sending, by the UE, uplink reference signals based on different uplink reference signal resource information with different beamforming gains, where M is a positive integer greater than or equal to 2.

Optionally, the receiving, by user equipment UE, M pieces of uplink reference signal resource information sent by a base station includes: receiving, by the UE, the M pieces of uplink reference signal resource information sent by the base station by using higher layer signaling or physical layer signaling.

Optionally, the method further includes: each piece of uplink reference signal resource information is corresponding to unique index information; and receiving, by the UE, index information sent by the base station by using the physical layer signaling, where the index information sent by using the physical layer signaling is used to indicate index information corresponding to uplink reference signal resource information used for uplink reference signal sending currently triggered by the base station.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the method further includes: receiving, by the UE, indication information sent by the base station, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing OFDM symbols used by the UE to send the uplink reference signal and a set of UE-specific second OFDM symbols used by the UE to send the uplink reference signal; and the set of first OFDM symbols includes the set of second OFDM symbols.

Optionally, the uplink reference signal symbol configuration information includes first indication sub-information and second indication sub-information, the first indication sub-information is used to indicate the set of first OFDM symbols used by the UE to send the uplink reference signal, and the second indication sub-information is used to indicate the set of second OFDM symbols used by the UE to send the uplink reference signal; the first indication sub-information is carried in the higher layer signaling or the physical layer signaling; and the second indication sub-information is carried in the higher layer signaling or the physical layer signaling.

The following describes an apparatus configured to perform the uplink reference signal sending method on the base station side. Corresponding technical effects are not described below again.

According to a third aspect, this application provides an uplink reference signal sending apparatus, including:

a configuration module, configured to configure M pieces of uplink reference signal resource information for user equipment UE, where M is a positive integer greater than or equal to 2; and a sending module, configured to send the M pieces of uplink reference signal resource information to the UE, so that the UE sends uplink reference signals based on different uplink reference signal resource information with different beamforming gains.

Optionally, the sending module is specifically configured to send the M pieces of uplink reference signal resource information to the UE by using higher layer signaling or physical layer signaling.

Optionally, each piece of uplink reference signal resource information is corresponding to unique index information; and the sending module is further configured to send index information by using the physical layer signaling, where the index information sent by using the physical layer signaling is used to indicate index information corresponding to uplink reference signal resource information used for uplink reference signal sending currently triggered by the apparatus, so that the UE sends the uplink reference signal by using the uplink reference signal resource information corresponding to the index information.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the sending module is further configured to send indication information to the UE, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing OFDM symbols used by the UE to send the uplink reference signal and a set of UE-specific second OFDM symbols used by the UE to send the uplink reference signal; and the set of first OFDM symbols includes the set of second OFDM symbols.

Optionally, the uplink reference signal symbol configuration information includes first indication sub-information and second indication sub-information, the first indication sub-information is used to indicate the set of first OFDM symbols used by the UE to send the uplink reference signal, and the second indication sub-information is used to indicate the set of second OFDM symbols used by the UE to send the uplink reference signal; the first indication sub-information is carried in the higher layer signaling or the physical layer signaling; and the second indication sub-information is carried in the higher layer signaling or the physical layer signaling.

The following describes an apparatus configured to perform the uplink reference signal sending method on the UE side. Corresponding technical effects are not described below again.

According to a fourth aspect, this application provides an uplink reference signal sending apparatus, including:

a receiving module, configured to receive M pieces of uplink reference signal resource information sent by a base station; and a sending module, configured to send uplink reference signals based on different uplink reference signal resource information with different beamforming gains, where M is a positive integer greater than or equal to 2.

Optionally, the receiving module is specifically configured to receive the M pieces of uplink reference signal resource information sent by the base station by using higher layer signaling or physical layer signaling.

Optionally, each of the M pieces of uplink reference signal resource information is corresponding to unique index information; and the receiving module is further configured to receive index information sent by the base station by using the physical layer signaling, where the index information sent by the physical layer signaling is used to indicate index information corresponding to uplink reference signal resource information used for uplink reference signal sending currently triggered by the base station.

Optionally, the uplink reference signal resource information is used by the apparatus to periodically or aperiodically send the uplink reference signal, and uplink reference signal resource information used for periodic uplink reference signal sending is different from uplink reference signal resource information used for aperiodic uplink reference signal sending.

Optionally, the receiving module is further configured to receive indication information sent by the base station, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing OFDM symbols used by the apparatus to send the uplink reference signal and a set of UE-specific second OFDM symbols used by the apparatus to send the uplink reference signal; and the set of first OFDM symbols includes the set of second OFDM symbols.

Optionally, the uplink reference signal symbol configuration information includes first indication sub-information and second indication sub-information, the first indication sub-information is used to indicate the set of first OFDM symbols used by the apparatus to send the uplink reference signal, and the second indication sub-information is used to indicate the set of second OFDM symbols used by the apparatus to send the uplink reference signal; the first indication sub-information is carried in the higher layer signaling or the physical layer signaling; and the second indication sub-information is carried in the higher layer signaling or the physical layer signaling.

According to a fifth aspect, this application provides a base station, including: a processor, configured to configure M pieces of uplink reference signal resource information for user equipment UE, where M is a positive integer greater than or equal to 2; and a transmitter, configured to send the M pieces of uplink reference signal resource information to the UE, so that the UE sends uplink reference signals based on different uplink reference signal resource information with different beamforming gains.

Optionally, the transmitter is specifically configured to send the M pieces of uplink reference signal resource information to the UE by using higher layer signaling or physical layer signaling.

Optionally, each piece of uplink reference signal resource information is corresponding to unique index information; and the transmitter is further configured to send index information by using the physical layer signaling, where the index information sent by using the physical layer signaling is used to indicate index information corresponding to uplink reference signal resource information used for uplink reference signal sending currently triggered by the base station, so that the UE sends the uplink reference signal by using the uplink reference signal resource information corresponding to the index information.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the transmitter is further configured to send indication information to the UE, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing OFDM symbols used by the UE to send the uplink reference signal and a set of UE-specific second OFDM symbols used by the UE to send the uplink reference signal; and the set of first OFDM symbols includes the set of second OFDM symbols.

Optionally, the uplink reference signal symbol configuration information includes first indication sub-information and second indication sub-information, the first indication sub-information is used to indicate the set of first OFDM symbols used by the UE to send the uplink reference signal, and the second indication sub-information is used to indicate the set of second OFDM symbols used by the UE to send the uplink reference signal; the first indication sub-information is carried in the higher layer signaling or the physical layer signaling; and the second indication sub-information is carried in the higher layer signaling or the physical layer signaling.

According to a sixth aspect, this application provides user equipment, including: a receiver, configured to receive M pieces of uplink reference signal resource information sent by a base station; and a transmitter, configured to send uplink reference signals based on different uplink reference signal resource information with different beamforming gains, where M is a positive integer greater than or equal to 2.

Optionally, the receiver is specifically configured to receive the M pieces of uplink reference signal resource information sent by the base station by using higher layer signaling or physical layer signaling.

Optionally, each of the M pieces of uplink reference signal resource information is corresponding to unique index information; and the receiver is further configured to receive index information sent by the base station by using the physical layer signaling, where the index information sent by using the physical layer signaling is used to indicate index information corresponding to uplink reference signal resource information used for uplink reference signal sending currently triggered by the base station.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the receiver is further configured to receive indication information sent by the base station, where the indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first orthogonal frequency division multiplexing OFDM symbols used by the UE to send the uplink reference signal and a set of UE-specific second OFDM symbols used by the UE to send the uplink reference signal; and the set of first OFDM symbols includes the set of second OFDM symbols.

Optionally, the uplink reference signal symbol configuration information includes first indication sub-information and second indication sub-information, the first indication sub-information is used to indicate the set of first OFDM symbols used by the UE to send the uplink reference signal, and the second indication sub-information is used to indicate the set of second OFDM symbols used by the UE to send the uplink reference signal; the first indication sub-information is carried in the higher layer signaling or the physical layer signaling; and the second indication sub-information is carried in the higher layer signaling or the physical layer signaling.

This application provides the uplink reference signal sending method and apparatus, the base station, and the user equipment. The method includes: configuring, by the base station, the M pieces of uplink reference signal resource information for the UE, where M is a positive integer greater than or equal to 2; and sending, by the base station, the M pieces of uplink reference signal resource information to the UE, so that the UE sends the uplink reference signals based on different uplink reference signal resource information with different beamforming gains. A path loss is compensated for by using a beamforming technology. In addition, the base station configures the M pieces of uplink reference signal resource information for the user equipment UE, so that the UE sends the uplink reference signals by using different relatively uplink reference signal resource information based on different beamforming gains. Therefore, uplink reference signal sending efficiency is improved.

DESCRIPTION OF EMBODIMENTS

Beamforming is a signal preprocessing technology based on an antenna array. During beamforming, a directional beam is generated by adjusting a weighting coefficient of each array element in the antenna array, so that an obvious array gain can be obtained. Therefore, the beamforming technology has a great advantage of expanding a coverage area, increasing an edge throughput, suppressing interference, and the like. In this application, different uplink reference signal resource information is configured for different beamforming gains based on the beamforming technology, to improve uplink reference signal sending efficiency.

Figure 1:
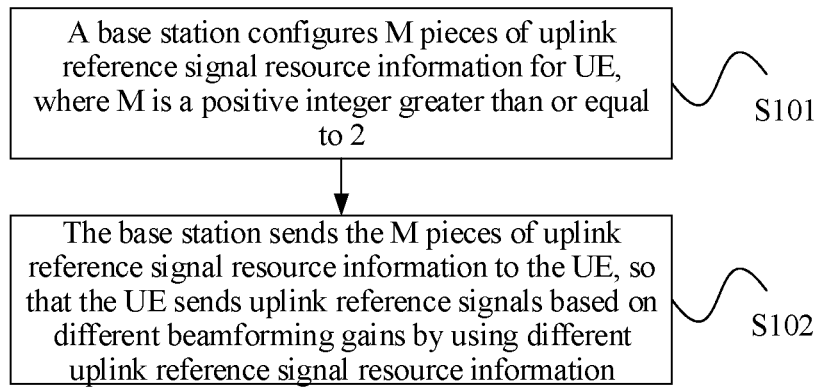
FIG. 1 is a schematic diagram of an uplink reference signal sending method according to an embodiment of this application.

FIG. 1 is a schematic diagram of an uplink reference signal sending method according to an embodiment of this application. As shown in FIG. 1, the method includes the following procedure:

Step S101: A base station configures M pieces of uplink reference signal resource information for UE, where M is a positive integer greater than or equal to 2.

Step S102: The base station sends the M pieces of uplink reference signal resource information to the UE, so that the UE sends uplink reference signals based on different uplink reference signal resource information with different beamforming gains.

In this embodiment, optionally, M is a quantity of formed beams or a quantity of pairs of receive and transmit beams. To be specific, the base station configures, based on different beam gains, different uplink reference signal resource information for uplink reference signal sending performed by using all formed beams. Each piece of uplink reference signal resource information includes uplink reference signal resource information required for R (R≥1) uplink reference signal transmissions. Specifically, the uplink reference signal resource information is resource information that is configured by the base station for the UE and that is used to send the uplink reference signal, and each piece of uplink reference signal resource information includes at least one of the following: comb configuration information, transmission bandwidth configuration information, frequency hopping configuration information, start frequency domain location information, subframe configuration information, and symbol configuration information.

The comb configuration information is used to indicate a quantity of combs that can be used by the UE to perform orthogonal frequency division multiplexing with another user when the UE sends the uplink reference signal. For example, a plurality of resource elements in one physical resource block are evenly interleaved and grouped into two parts. Each part of resources is corresponding to one comb, to be specific the two combs are a comb 1 and a comb 2. The comb configuration information is used to indicate that there are two combs that can be used by the UE to perform orthogonal frequency division multiplexing with the another user.

The transmission bandwidth configuration information is used to indicate a bandwidth that can be used by the UE when sending the uplink reference signal. For example, in current Long Term Evolution (LTE), an uplink reference signal transmission bandwidth may be any one of four resource blocks (RB), eight RBs, 12 RBs, and 24 RBs.

The frequency hopping configuration information is used to instruct whether to perform frequency hopping when the UE sends the uplink reference signal. For example, the uplink reference signal frequency hopping configuration information is used to instruct the UE to perform uplink reference signal frequency hopping, or is used to instruct the UE not to perform uplink reference signal frequency hopping. The uplink reference signal frequency hopping means that the UE sends the uplink reference signals at different sending moments by occupying different frequency domain resources.

The start frequency domain location information is used to indicate a start frequency domain location, occupied before the UE performs uplink reference signal frequency hopping, of the UE.

The subframe configuration information is used to indicate a subframe occupied when the UE sends the uplink reference signal.

The symbol configuration information is used to indicate a symbol occupied when the UE sends the uplink reference signal.

Specifically, specific descriptions are separately provided below by using an example in which the base station configures different uplink reference signal transmission bandwidth configuration information and different uplink reference signal comb configuration information based on different beamforming gains for uplink reference signal sending performed by using all formed beams.

For example, considering that the UE has different antenna gains in case of different transmit beams and therefore corresponding uplink reference signal transmission bandwidths are different, the base station configures different transmission bandwidth configuration information based on different beamforming gains for uplink reference signal sending performed by using all formed beams. When an antenna gain is relatively small, the UE needs to compensate for a path loss by using relatively large transmit power. However, if the power is limited, a bandwidth used by the UE to send the uplink reference signal is relatively low. In this case, the base station configures, for the uplink reference signal sending, transmission bandwidth configuration information corresponding to a relatively low bandwidth. However, when an antenna gain is relatively large, the UE can compensate for a path loss only by using relatively small transmit power, and a bandwidth used by the UE to send the uplink reference signal is relatively high. In this case, the base station configures, for the uplink reference signal sending, transmission bandwidth configuration information corresponding to a relatively high bandwidth. Therefore, measurement and obtaining of full-bandwidth channel quality information can be quickly completed by using a relatively small quantity of times of uplink reference signal sending.

Different transmit beams are corresponding to different receive beams, and a receive beam and a transmit beam that have a correspondence are collectively referred to as a pair of receive and transmit beams. Because each pair of receive and transmit beams is corresponding to a different quantity of UEs that send uplink reference signals, different pairs of receive and transmit beams are corresponding to different comb configuration information. For example, when a pair of receive and transmit beams is corresponding to a relatively large quantity of UEs that send uplink reference signals, a relatively large quantity of combs may be configured; or when a pair of receive and transmit beams is corresponding to a relatively small quantity of UEs that send uplink reference signals, a relatively small quantity of combs may be configured.

This application provides the uplink reference signal sending method. A path loss is compensated for by using a beamforming technology. In addition, the base station configures the M pieces of uplink reference signal resource information for the user equipment UE, so that the UE sends the uplink reference signals by using different relatively uplink reference signal resource information based on different beamforming gains. Therefore, uplink reference signal sending efficiency is improved.

Optionally, step S102 includes: sending, by the base station, the M pieces of uplink reference signal resource information to the UE by using physical layer signaling or higher layer signaling such as radio resource control (RRC) signaling. Certainly, the base station may alternatively send the M pieces of uplink reference signal resource information by using dedicated signaling. To be specific, the dedicated signaling is specially used to send the uplink reference signal resource information, and the signaling is not signaling that exists in the communications field. It should be noted that how to send the M pieces of uplink reference signal resource information is not limited in this application.

Optionally, the base station may configure at least one uplink reference signal process for each UE. The uplink reference signal process includes uplink reference signal resource information corresponding to a plurality of formed beams, and each piece of uplink reference signal resource information is corresponding to unique index information.

For example, an uplink reference signal process configured by the base station for one UE is as follows:

uplink reference signal process configuration
{uplink reference signal configuration #1; For beam 1
uplink reference signal configuration #2; For beam 2
uplink reference signal configuration #3; For beam 3
uplink reference signal configuration #4; For beam 4
}

The uplink reference signal configurations #1, #2, #3, and #4 are index information of four pieces of uplink reference signal resource information corresponding to the formed beam 1, the formed beam 2, the formed beam 3, and the formed beam 4.

In another optional implementation, the base station configures at least one uplink reference signal process for the UE. The uplink reference signal process includes at least two pieces of uplink reference signal resource information. For example, the uplink reference signal process includes two pieces of uplink reference signal resource information that are first uplink reference signal resource information and second uplink reference signal resource information. The first uplink reference signal resource information is used for sending a non-beamformed non-precoded uplink reference signal, and the second uplink reference signal resource information is used for sending a beamformed uplink reference signal. The first uplink reference signal resource information is different from the second uplink reference signal resource information. That the first uplink reference signal resource information is different from the second uplink reference signal resource information means that the first uplink reference signal resource information and the second uplink reference signal resource information have different configuration information of at least one field.

Optionally, uplink reference signal sending corresponding to different system parameters is corresponding to different uplink reference signal resource information. To be specific, uplink reference signal resource information is related to a system parameter corresponding to uplink reference signal sending. The system parameter herein is information such as a subcarrier spacing corresponding to uplink reference signal transmission. For example, when an uplink reference signal is sent when the system parameter is 30 KHz, uplink reference signal comb configuration information corresponding to the uplink reference signal sending is a comb 4; or when an uplink reference signal is sent when the system parameter is 15 KHz, uplink reference signal comb configuration information corresponding to the uplink reference signal sending is a comb 2. Transmission bandwidth configuration information for uplink reference signal sending corresponding to different system parameters may also be different. For example, when an uplink reference signal is sent when the system parameter is 30 KHz, an uplink reference signal transmission bandwidth corresponding to the uplink reference signal sending is a half of a corresponding uplink reference signal transmission bandwidth when the system parameter is 15 KHz.

When the UE switches from a system parameter 1 to a system parameter 2, uplink reference signal resource information corresponding to the UE also switches from uplink reference signal resource information corresponding to the system parameter 1 to uplink reference signal resource information corresponding to the system parameter 2.

Optionally, the method further includes the following: The base station indicates, by using the physical layer signaling such as downlink control information (DCI), index information corresponding to uplink reference signal resource information used for uplink reference signal sending currently triggered by the base station, so that the UE can determine, based on the index information carried in the DCI, the uplink reference signal resource information used for current uplink reference signal sending.

Optionally, the uplink reference signal resource information is used by the UE to periodically or aperiodically or semi-persistently send the uplink reference signal. The foregoing DCI is applicable to both periodic uplink reference signal sending and aperiodic uplink reference signal sending. Specifically, for example, the index information corresponding to the uplink reference signal resource information used for the currently triggered uplink reference signal sending is indicated by using a field such as an uplink reference signal request field (2 bits to 3 bits), specially used to trigger uplink reference signal sending, in a DCI format 0 and/or format 4 and that is. Optionally, the index information corresponding to the uplink reference signal resource information used for currently triggered uplink reference signal sending is also indicated by using at least one bit in DCI formats 1A, 2B, 2C, and 2D.

Particularly, for the aperiodic uplink reference signal sending, whether the uplink reference signal sending is triggered is also indicated by using at least one bit in the DCI. For example, a bit 0 indicates that the uplink reference signal sending is not triggered, and a bit 1 indicates that the uplink reference signal sending is triggered. When the bit 1 indicates that the uplink reference signal sending is triggered, more bits may be further used to indicate the index information corresponding to the uplink reference signal resource information used for the currently triggered uplink reference signal sending. Further, at least one bit in the DCI may be used to indicate whether the UE is triggered to perform one time of uplink reference signal sending or continuously perform M (M≥1) times of uplink reference signal sending. Each time of uplink reference signal sending may be corresponding to one formed beam, and the M times of uplink reference signal sending are corresponding to uplink reference signals of M formed beams. Optionally, the M formed beams herein may be M same formed beams or M different formed beams. This is not limited in this application.

Still further, because a periodically sent uplink reference signal is usually sent in a non-beamformed manner or by using a wide beam and an aperiodically sent uplink reference signal is sent by using a specific slender beam, a beamforming gain corresponding to periodic uplink reference signal sending is different from a beamforming gain corresponding to aperiodic uplink reference signal sending. Therefore, uplink reference signal resource information used for the periodic uplink reference signal sending is different from uplink reference signal resource information used for the aperiodic uplink reference signal sending. For example, a resource configuration index corresponding to the uplink reference signal resource information used for the periodically sent uplink reference signal is 1, and a resource configuration index corresponding to the uplink reference signal resource information used for the aperiodically sent uplink reference signal is 2.

Optionally, the method further includes the following: The base station sends indication information to the UE. The indication information is carried in the physical layer signaling and is used to indicate the beginning of the uplink reference signal sending and/or the end of the uplink reference signal sending.

Figure 2:
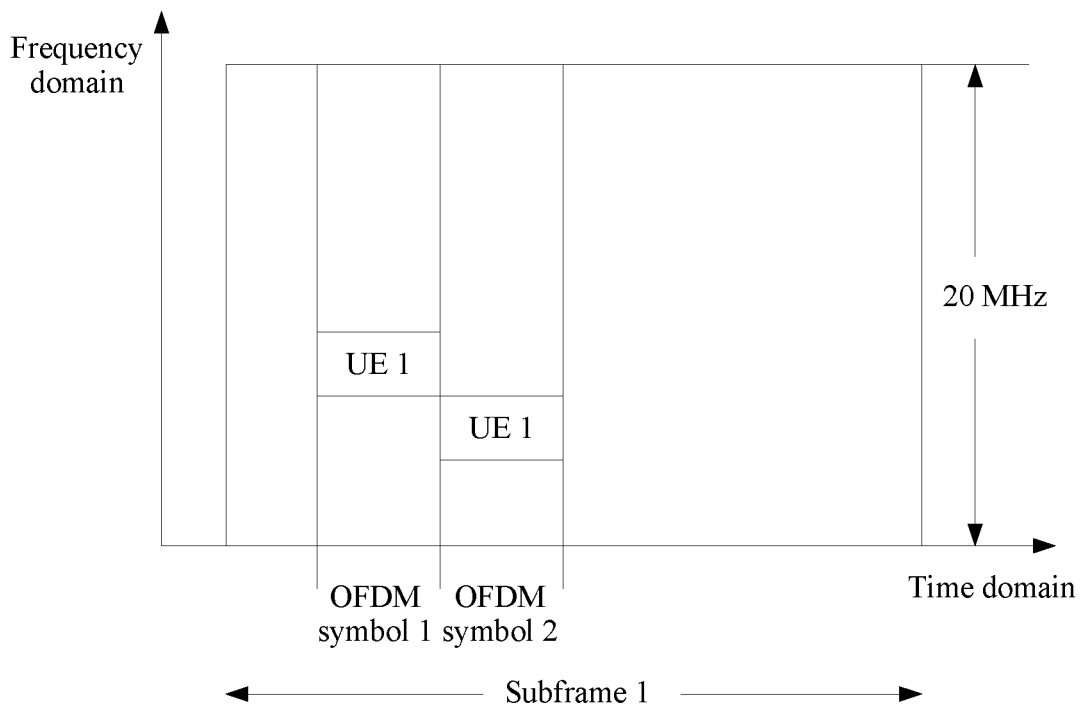
FIG. 2 is a schematic structural diagram of a frame according to an embodiment of this application.

Optionally, this application may be applied to a high-bandwidth scenario and/or a low-bandwidth scenario. For example, this application may be applied to a typical high-frequency scenario. A relatively high system bandwidth may be supported in the high-frequency scenario, and a delay of scanning the entire system bandwidth by the UE is relatively large. To improve a speed and efficiency of channel estimation of the UE and reduce the delay of scanning the system bandwidth by the UE, uplink reference signal sending and frequency hopping in the full bandwidth may be centralized on a plurality of orthogonal frequency division multiplexing (OFDM) symbols in one or more subframes. Therefore, the uplink reference signal resource information includes the uplink reference signal subframe configuration information and the uplink reference signal symbol configuration information. The uplink reference signal subframe configuration information is used to indicate a subframe occupied when the uplink reference signal is sent. The uplink reference signal symbol configuration information is used to indicate a symbol occupied when the uplink reference signal is sent and/or a quantity of symbols occupied when the uplink reference signal is sent. For example, FIG. 2 is a schematic structural diagram of a frame according to an embodiment of this application. As shown in FIG. 2, UE 1 sends uplink reference signals on an OFDM symbol 1 and an OFDM symbol 2 in a subframe 1 based on uplink reference signal subframe configuration information and uplink reference signal symbol configuration information that are configured by the base station for the UE 1.

Optionally, the uplink reference signal symbol configuration information indicates a set of cell-specific first OFDM symbols used by the UE to send the uplink reference signal and a set of UE-specific second OFDM symbols used by the UE to send the uplink reference signal. The set of first OFDM symbols includes the set of second OFDM symbols. To be specific, transmission bandwidths used when different UEs send uplink reference signals may be different. It is assumed that each UE can send the uplink reference signal only on one narrow band within each OFDM symbol. In this case, different quantities of OFDM symbols are occupied by different UEs after the entire system bandwidth is traversed. Therefore, the base station may perform flexible configuration depending on different requirements of the UE. To be specific, the base station configures, for the UE, the set of cell-specific first orthogonal frequency division multiplexing OFDM symbols used to send the uplink reference signal, and configures, for the UE, the set of UE-specific second OFDM symbols used to send the uplink reference signal. Optionally, configuration information of the set of first OFDM symbols includes a start symbol location of the first OFDM symbol and a quantity of first OFDM symbols. Likewise, configuration information of the set of UE-specific second OFDM symbols includes a start symbol location of the UE-specific second OFDM symbol and a quantity of second OFDM symbols.

Optionally, the uplink reference signal symbol configuration information includes first indication sub-information and second indication sub-information. The first indication sub-information is used to indicate the set of first OFDM symbols used for the uplink reference signal sending currently triggered by the base station. The second indication sub-information is used to indicate the set of UE-specific second OFDM symbols used for the uplink reference signal sending currently triggered by the base station.

The first indication sub-information is carried in the higher layer signaling or the physical layer signaling. For example, the first indication sub-information may be carried in the DCI.

The second indication sub-information is carried in the higher layer signaling or the physical layer signaling. For example, the second indication sub-information may also be carried in the DCI.

Figure 3:
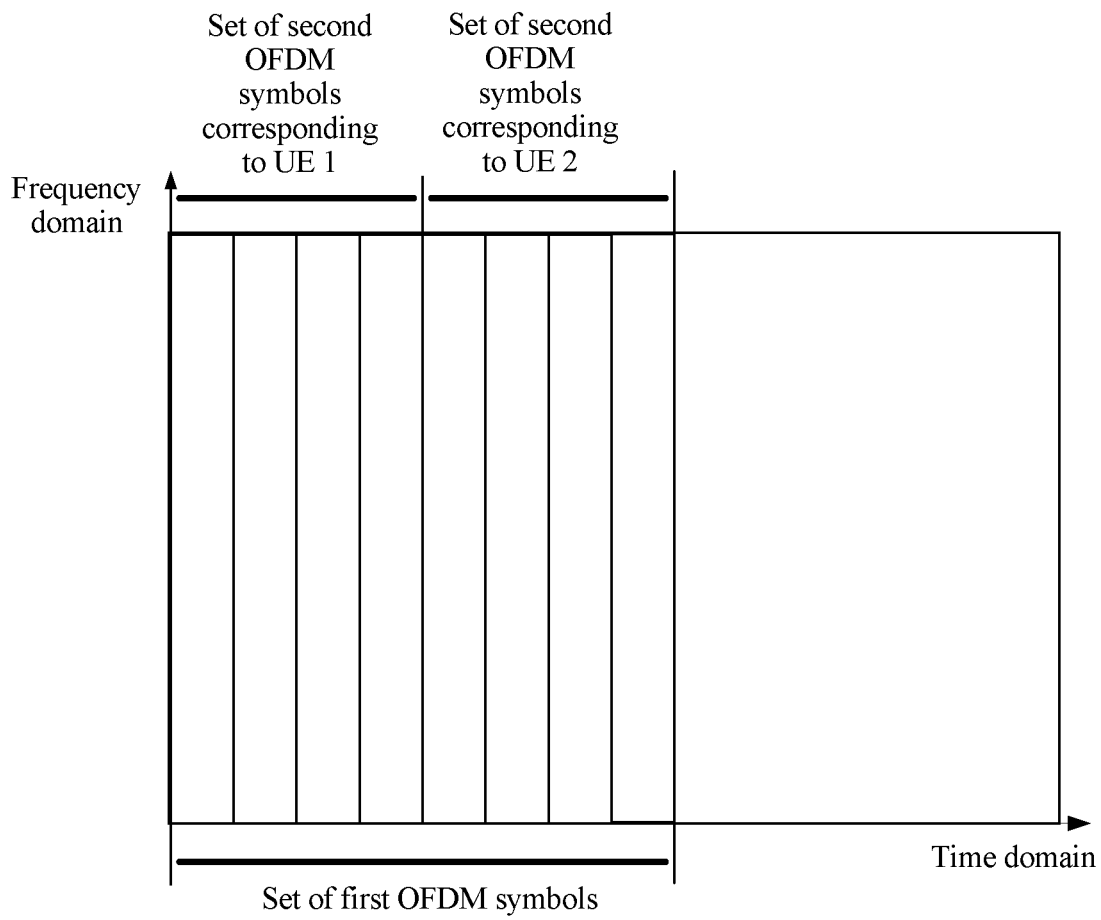
FIG. 3 is a schematic diagram of a set of first OFDM symbols and a set of second OFDM symbols that are configured by a base station for UE according to an embodiment of this application.

For example, FIG. 3 is a schematic diagram of a set of first OFDM symbols and a set of second OFDM symbols that are configured by a base station for UE according to an embodiment of this application. As shown in FIG. 3, a set of cell-specific first OFDM symbols includes first eight OFDM symbols of a subframe, a set of UE-specific second OFDM symbols configured by the base station for UE 1 includes first four OFDM symbols in the set of first OFDM symbols, and a set of UE-specific second OFDM symbols configured by the base station for UE 2 includes last four OFDM symbols in the set of first OFDM symbols. For specific requirements of different users, the base station may flexibly schedule OFDM symbols in the set of first OFDM symbols. Therefore, the set of first OFDM symbols and the set of UE-specific second OFDM symbols are introduced, to maximize a quantity of UEs that perform uplink reference signal multiplexing in a cell and minimize a time for obtaining a channel of an entire system bandwidth by each UE through measurement.

It should be noted that, the base station configures, for the UE, the set of cell-specific first OFDM symbols used to send the uplink reference signal, and configures, for the UE, the set of UE-specific second OFDM symbols used to send the uplink reference signal. The set of first OFDM symbols and the set of second OFDM symbols may be applied to sending of a beamformed uplink reference signal, and may be further applied to sending of a non-beamformed uplink reference signal. This is not limited in this application.

Figure 4:
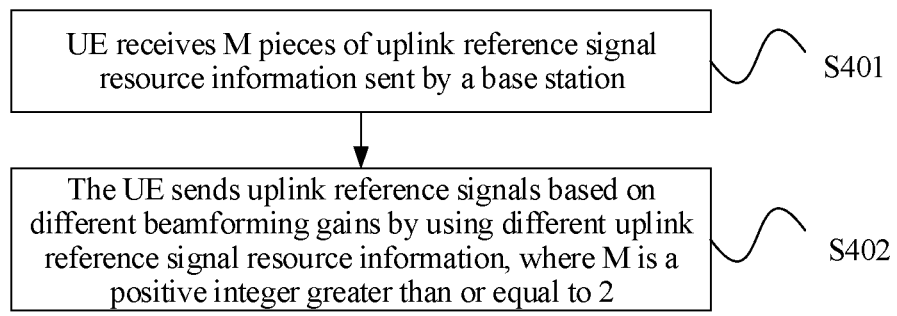
FIG. 4 is a schematic diagram of an uplink reference signal sending method according to another embodiment of this application.

FIG. 4 is a schematic diagram of an uplink reference signal sending method according to another embodiment of this application. As shown in FIG. 4, the method includes the following procedures:

Step S401: UE receives M pieces of uplink reference signal resource information sent by a base station.

Step S402: The UE sends uplink reference signals based on different uplink reference signal resource information with different beamforming gains, where M is a positive integer greater than or equal to 2.

Specifically, M is a quantity of formed beams. To be specific, the base station configures, based on different beamforming gains, different uplink reference signal resource information corresponding to all formed beams. The uplink reference signal resource information is resource information that is configured by the base station for the UE and that is used to send the uplink reference signal. The configured resource information may include at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

This application provides the uplink reference signal sending method. A large path loss in a signal transmission process is compensated for by using a beamforming technology. In addition, the UE sends the uplink reference signals based on different uplink reference signal resource information with different beamforming gains. Therefore, uplink reference signal sending efficiency can be greatly improved.

An optional manner of step S401 is as follows: The UE receives the M pieces of uplink reference signal resource information sent by the base station by using physical layer signaling or higher layer signaling such as RRC signaling.

Optionally, the method further includes the following: Each piece of uplink reference signal resource information is corresponding to unique index information; and the UE receives index information sent by the base station by using the physical layer signaling. The index information sent by using the physical layer signaling is used to indicate index information corresponding to uplink reference signal resource information used for uplink reference signal sending currently triggered by the base station.

Optionally, the uplink reference signal resource information is used by the UE to periodically or aperiodically send the uplink reference signal, and resource information used for periodic uplink reference signal sending is different from resource information used for aperiodic uplink reference signal sending.

Optionally, the method further includes the following: The UE receives indication information sent by the base station. The indication information is carried in the physical layer signaling and is used to indicate the beginning of the uplink reference signal sending and/or the end of the uplink reference signal sending.

Optionally, the uplink reference signal symbol configuration information indicates a set of cell-specific first OFDM symbols used by the UE to send the uplink reference signal and a set of UE-specific second OFDM symbols used by the UE to send the uplink reference signal. The set of first OFDM symbols includes the set of second OFDM symbols. The uplink reference signal symbol configuration information includes first indication sub-information and second indication sub-information. The first indication sub-information is used to indicate the set of first OFDM symbols used by the UE to send the uplink reference signal. The second indication sub-information is used to indicate the set of second OFDM symbols used by the UE to send the uplink reference signal. The first indication sub-information is carried in the higher layer signaling or the physical layer signaling. The second indication sub-information is carried in the higher layer signaling or the physical layer signaling.

The set of first OFDM symbols and the set of UE-specific second OFDM symbols are introduced, to maximize a quantity of UEs that perform uplink reference signal multiplexing in a cell and minimize a delay of measuring a system bandwidth channel by each UE.

To obtain information about an optimal pair of receive and transmit beams through polling, a transmit side (such as the base station or the UE) needs to scan P (P≥1) transmit beams, and in addition, a receive side (such as the UE or the base station) needs to scan Q (Q≥1) receive beams. The optimal pair of receive and transmit beams may be obtained in the following receive and transmit beam scanning manners:

Manner 1: The transmit beams (P times of sending) are polled first, and then the receive beams (Q times of receiving) are polled.

Manner 2: The receive beams (Q times of receiving) are polled first, and then the transmit beams (P times of sending) are polled.

Manner 3: The transmit beams and the receive beams (P×Q times of sending/receiving) are polled together.

The receive side notifies or reports a quantity Q of receive beams to the transmit side, so that the transmit side determines a receive and transmit beam scanning manner used for to-be-performed data transmission. Further, the transmit side notifies the receive side of the receive and transmit beam scanning manner or a beam scanning sequence. The transmit side notifies the receive side of the receive and transmit beam scanning manner or the scanning sequence by using higher layer signaling and/or physical layer signaling. Optionally, the receive and transmit beam scanning manner or the scanning sequence herein may also be corresponding to a predefined configuration set.

Figure 5:
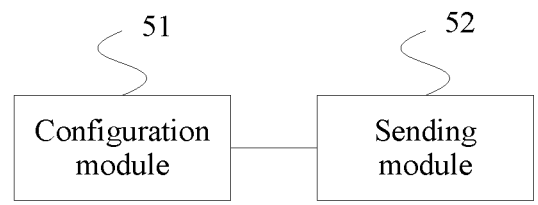
FIG. 5 is a schematic structural diagram of an uplink reference signal sending apparatus according to an embodiment of this application.

FIG. 5 is a schematic structural diagram of an uplink reference signal sending apparatus according to an embodiment of this application. As shown in FIG. 5, the apparatus includes:

a configuration module 51, configured to configure M pieces of uplink reference signal resource information for user equipment UE, where M is a positive integer greater than or equal to 2; and a sending module 52, configured to send the M pieces of uplink reference signal resource information to the UE, so that the UE sends uplink reference signals based on different uplink reference signal resource information with different beamforming gains.

The uplink reference signal sending apparatus provided in this embodiment may be configured to perform the technical solution of the embodiment of the uplink reference signal sending method corresponding to FIG. 1. An implementation principle and a technical effect of the uplink reference signal sending apparatus are similar to those of the uplink reference signal sending method, and are not described herein again.

Further, as shown in FIG. 5, the sending module 52 is specifically configured to send the M pieces of uplink reference signal resource information to the UE by using physical layer signaling or higher layer signaling such as RRC signaling.

Optionally, each piece of uplink reference signal resource information is corresponding to unique index information. The sending module 52 is further configured to send index information by using the physical layer signaling. The index information sent by using the physical layer signaling is used to indicate index information corresponding to uplink reference signal resource information used for uplink reference signal sending currently triggered by the apparatus, so that the UE sends the uplink reference signal by using the uplink reference signal resource information corresponding to the index information.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the sending module 52 is further configured to send indication information to the UE. The indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the configuration module 51 is further configured to: configure, for the UE, a set of cell-specific first OFDM symbols used to send the uplink reference signal, and configure, for the UE, a set of UE-specific second OFDM symbols used to send the uplink reference signal.

Optionally, the uplink reference signal symbol configuration information indicates the set of cell-specific first OFDM symbols used by the UE to send the uplink reference signal and the set of UE-specific second OFDM symbols used by the UE to send the uplink reference signal. The set of first OFDM symbols includes the set of second OFDM symbols.

Optionally, the uplink reference signal symbol configuration information includes first indication sub-information and second indication sub-information. The first indication sub-information is used to indicate the set of first OFDM symbols used by the UE to send the uplink reference signal. The second indication sub-information is used to indicate the set of second OFDM symbols used by the UE to send the uplink reference signal. The first indication sub-information is carried in the higher layer signaling or the physical layer signaling. The second indication sub-information is carried in the higher layer signaling or the physical layer signaling.

The uplink reference signal sending apparatus provided in this embodiment may be configured to perform the technical solution of the embodiment of the uplink reference signal sending method corresponding to FIG. 1 and an optional technical solution corresponding to FIG. 1. An implementation principle and a technical effect of the uplink reference signal sending apparatus are similar to those of the uplink reference signal sending method, and are not described herein again.

Figure 6:
FIG. 6 is a schematic structural diagram of an uplink reference signal sending apparatus according to another embodiment of this application.

FIG. 6 is a schematic structural diagram of an uplink reference signal sending apparatus according to another embodiment of this application. As shown in FIG. 6, a receiving module 61 is configured to receive M pieces of uplink reference signal resource information sent by a base station, and a sending module 62 is configured to send uplink reference signals based on different uplink reference signal resource information with different beamforming gains, where M is a positive integer greater than or equal to 2.

The uplink reference signal sending apparatus provided in this embodiment may be configured to perform the technical solution of the embodiment of the uplink reference signal sending method corresponding to FIG. 4. An implementation principle and a technical effect of the uplink reference signal sending apparatus are similar to those of the uplink reference signal sending method, and are not described herein again.

Optionally, the receiving module 61 is specifically configured to receive the M pieces of uplink reference signal resource information sent by the base station by using physical layer signaling or higher layer signaling such as RRC signaling.

Optionally, each of the M pieces of uplink reference signal resource information is corresponding to unique index information. The receiving module 61 is further configured to receive index information sent by the base station by using the physical layer signaling. The index information sent by using the physical layer signaling is used to indicate index information corresponding to uplink reference signal resource information used for uplink reference signal sending currently triggered by the base station.

Optionally, the uplink reference signal resource information is used by the apparatus to periodically or aperiodically send the uplink reference signal, and uplink reference signal resource information used for periodic uplink reference signal sending is different from uplink reference signal resource information used for aperiodic uplink reference signal sending.

Optionally, the receiving module 61 is further configured to receive indication information sent by the base station. The indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first OFDM symbols used by the apparatus to send the uplink reference signal and a set of UE-specific second OFDM symbols used by the apparatus to send the uplink reference signal. The set of first OFDM symbols includes the set of second OFDM symbols.

Optionally, the uplink reference signal symbol configuration information includes first indication sub-information and second indication sub-information. The first indication sub-information is used to indicate the set of first OFDM symbols used by the apparatus to send the uplink reference signal. The second indication sub-information is used to indicate the set of second OFDM symbols used by the apparatus to send the uplink reference signal. The first indication sub-information is carried in the higher layer signaling or the physical layer signaling. The second indication sub-information is carried in the higher layer signaling or the physical layer signaling.

The uplink reference signal sending apparatus provided in this embodiment may be configured to perform the technical solution of the embodiment of the uplink reference signal sending method corresponding to FIG. 4 and an optional technical solution corresponding to FIG. 4. An implementation principle and a technical effect of the uplink reference signal sending apparatus are similar to those of the uplink reference signal sending method, and are not described herein again.

Figure 7:
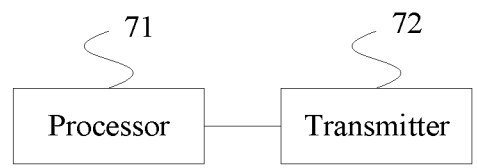
FIG. 7 is a schematic diagram of a base station according to an embodiment of this application.

FIG. 7 is a schematic diagram of a base station according to an embodiment of this application. As shown in FIG. 7, the base station includes: a processor 71, configured to configure M pieces of uplink reference signal resource information for UE, where M is a positive integer greater than or equal to 2; and a transmitter 72, configured to send the M pieces of uplink reference signal resource information to the UE, so that the UE sends uplink reference signals based on different uplink reference signal resource information with different beamforming gains.

Optionally, the transmitter 72 is specifically configured to send the M pieces of uplink reference signal resource information to the UE by using physical layer signaling or higher layer signaling such as RRC signaling.

Optionally, each piece of uplink reference signal resource information is corresponding to unique index information. The transmitter 72 is further configured to send index information by using the physical layer signaling. The index information sent by using the physical layer signaling is used to indicate index information corresponding to uplink reference signal resource information used for uplink reference signal sending currently triggered by the base station, so that the UE sends the uplink reference signal by using the uplink reference signal resource information corresponding to the index information.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the transmitter 72 is further configured to send indication information to the UE. The indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first OFDM symbols used by the UE to send the uplink reference signal and a set of UE-specific second OFDM symbols used by the UE to send the uplink reference signal. The set of first OFDM symbols includes the set of second OFDM symbols.

The uplink reference signal symbol configuration information includes first indication sub-information and second indication sub-information. The first indication sub-information is used to indicate the set of first OFDM symbols used by the UE to send the uplink reference signal. The second indication sub-information is used to indicate the set of second OFDM symbols used by the UE to send the uplink reference signal. The first indication sub-information is carried in the higher layer signaling or the physical layer signaling. The second indication sub-information is carried in the higher layer signaling or the physical layer signaling.

The base station provided in this embodiment may be configured to perform the technical solution of the embodiment of the uplink reference signal sending method corresponding to FIG. 1 and an optional technical solution corresponding to FIG. 1. An implementation principle and a technical effect of the base station are similar to those of the uplink reference signal sending method, and are not described herein again.

Figure 8:
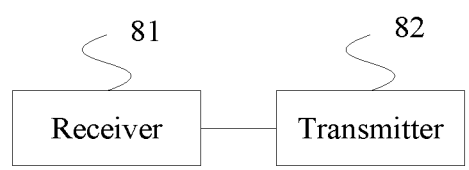
FIG. 8 is a schematic diagram of user equipment according to an embodiment of this application.

FIG. 8 is a schematic diagram of user equipment according to an embodiment of this application. As shown in FIG. 8, the user equipment includes: a receiver 81, configured to receive M pieces of uplink reference signal resource information sent by a base station; and a transmitter 82, configured to send uplink reference signals based on different uplink reference signal resource information with different beamforming gains, where M is a positive integer greater than or equal to 2.

The user equipment provided in this embodiment may be configured to perform the technical solution of the embodiment of the uplink reference signal sending method corresponding to FIG. 4. An implementation principle and a technical effect of the user equipment are similar to those of the uplink reference signal sending method, and are not described herein again.

Optionally, the receiver 81 is specifically configured to receive the M pieces of uplink reference signal resource information sent by the base station by using physical layer signaling or higher layer signaling such as RRC signaling.

Optionally, each of the M pieces of uplink reference signal resource information is corresponding to unique index information. The receiver 81 is further configured to receive index information sent by the base station by using the physical layer signaling. The index information sent by using the physical layer signaling is used to indicate index information corresponding to uplink reference signal resource information used for uplink reference signal sending currently triggered by the base station.

Optionally, the uplink reference signal resource information is used by the UE to periodically or aperiodically send the uplink reference signal, and uplink reference signal resource information used for periodic uplink reference signal sending is different from uplink reference signal resource information used for aperiodic uplink reference signal sending.

Optionally, the receiver 81 is further configured to receive indication information sent by the base station. The indication information is carried in the physical layer signaling and is used to indicate the beginning of the uplink reference signal sending and/or the end of the uplink reference signal sending.

Optionally, the uplink reference signal resource information includes at least one of the following: uplink reference signal comb configuration information, uplink reference signal transmission bandwidth configuration information, uplink reference signal frequency hopping configuration information, uplink reference signal start frequency domain location information, uplink reference signal subframe configuration information, and uplink reference signal symbol configuration information.

Optionally, the uplink reference signal symbol configuration information indicates a set of cell-specific first OFDM symbols used by the UE to send the uplink reference signal and a set of UE-specific second OFDM symbols used by the UE to send the uplink reference signal. The set of first OFDM symbols includes the set of second OFDM symbols.

The uplink reference signal symbol configuration information includes first indication sub-information and second indication sub-information. The first indication sub-information is used to indicate the set of first OFDM symbols used by the UE to send the uplink reference signal. The second indication sub-information is used to indicate the set of second OFDM symbols used by the UE to send the uplink reference signal. The first indication sub-information is carried in the higher layer signaling or the physical layer signaling. The second indication sub-information is carried in the higher layer signaling or the physical layer signaling.

What is claimed is:

1. An uplink reference signal sending method, comprising:
   configuring, by a base station, M pieces of uplink reference signal resource information for a user equipment (UE), wherein M is a positive integer greater than or equal to 2; and
   sending, by the base station, the M pieces of uplink reference signal resource information to the UE for facilitating the UE to send uplink reference signals based on different uplink reference signal resource information with different beamforming gains,
   wherein
   the uplink reference signal resource information comprises uplink reference signal symbol configuration information indicating a set of cell-specific symbols comprising UE-specific symbols for use by the UE to send the uplink reference signal,
   the set of cell-specific symbols comprises a set of cell-specific first orthogonal frequency division multiplexing (OFDM) symbols for use by the UE to send the uplink reference signal and the UE-specific symbols comprise a set of UE-specific second OFDM symbols for use by the UE to send the uplink reference signal, and
   the set of first OFDM symbols comprises the set of second OFDM symbols.

2. The method according to claim 1, wherein sending, by the base station, the M pieces of uplink reference signal resource information to the UE comprises:
   sending, by the base station, the M pieces of uplink reference signal resource information to the UE by using higher layer signaling or physical layer signaling.

3. The method according to claim 1, wherein the uplink reference signal resource information further comprises at least one of the following:
   uplink reference signal comb configuration information, uplink reference signal transmission bandwidth configuration information, uplink reference signal frequency hopping configuration information, uplink reference signal start frequency domain location information, or uplink reference signal subframe configuration information.

4. The method according to claim 1, wherein:
   the uplink reference signal symbol configuration information comprises first indication sub-information for indicating the set of first OFDM symbols for use by the UE to send the uplink reference signal and second indication sub-information for indicating the set of second OFDM symbols for use by the UE to send the uplink reference signal;
   the first indication sub-information is carried in a higher layer signaling or the physical layer signaling; and
   the second indication sub-information is carried in the higher layer signaling or the physical layer signaling.

5. An uplink reference signal sending method, comprising:
   receiving, by a user equipment (UE), M pieces of uplink reference signal resource information sent by a base station; and
   sending, by the UE, uplink reference signals based on different uplink reference signal resource information with different beamforming gains,
   wherein
   the uplink reference signal resource information comprises uplink reference signal symbol configuration information indicating a set of cell-specific symbols comprising UE-specific symbols for use by the UE to send the uplink reference signal,
   the set of cell-specific symbols comprises a set of cell-specific first orthogonal frequency division multiplexing (OFDM) symbols for use by the UE to send the uplink reference signal and the UE-specific symbols comprise a set of UE-specific second OFDM symbols for use by the UE to send the uplink reference signal,
   the set of first OFDM symbols comprises the set of second OFDM symbols, and
   M is a positive integer greater than or equal to 2.

6. The method according to claim 5, wherein receiving, by user equipment (UE), M pieces of uplink reference signal resource information sent by a base station comprises:
   receiving, by the UE, the M pieces of uplink reference signal resource information sent by the base station by using higher layer signaling or physical layer signaling.

7. The method according to claim 5, wherein the uplink reference signal resource information further comprises at least one of the following:
   uplink reference signal comb configuration information, uplink reference signal transmission bandwidth configuration information, uplink reference signal frequency hopping configuration information, uplink reference signal start frequency domain location information, or uplink reference signal subframe configuration information.

8. The method according to claim 5, wherein:
   the uplink reference signal symbol configuration information comprises first indication sub-information that indicates the set of first OFDM symbols for use by the UE to send the uplink reference signal and second indication sub-information that indicates the set of second OFDM symbols for use by the UE to send the uplink reference signal;
   the first indication sub-information is carried in a higher layer signaling or the physical layer signaling; and
   the second indication sub-information is carried in the higher layer signaling or the physical layer signaling.

9. User equipment, comprising:
   a receiver, configured to receive M pieces of uplink reference signal resource information sent by a base station; and
   a transmitter, configured to send uplink reference signals based on different uplink reference signal resource information with different beamforming gains,
   wherein
   the uplink reference signal resource information comprises uplink reference signal symbol configuration information indicating a set of cell-specific symbols comprising UE-specific symbols for use by the UE to send the uplink reference signal,
   the set of cell-specific symbols comprises a set of cell-specific first orthogonal frequency division multiplexing (OFDM) symbols for use by the UE to send the uplink reference signal and the UE-specific symbols comprise a set of UE-specific second OFDM symbols for use by the UE to send the uplink reference signal,
   the set of first OFDM symbols comprises the set of second OFDM symbols, and
   M is a positive integer greater than or equal to 2.

10. The user equipment according to claim 9, wherein the receiver is configured to:

receive the M pieces of uplink reference signal resource information sent by the base station by using higher layer signaling or physical layer signaling.

11. The user equipment according to claim 9, wherein the uplink reference signal resource information further comprises at least one of the following:

uplink reference signal comb configuration information, uplink reference signal transmission bandwidth configuration information, uplink reference signal frequency hopping configuration information, uplink reference signal start frequency domain location information, or uplink reference signal subframe configuration information.

12. The user equipment according to claim 9, wherein:

the uplink reference signal symbol configuration information comprises first indication sub-information that indicates the set of first OFDM symbols for use by the UE to send the uplink reference signal and second indication sub-information that indicates the set of second OFDM symbols for use by the UE to send the uplink reference signal;

the first indication sub-information is carried in a higher layer signaling or the physical layer signaling; and the second indication sub-information is carried in the higher layer signaling or the physical layer signaling.

* * * * *